3,281,987
SOIL CONDITIONING
David B. Scott, Salinas, Calif., assignor to Union Carbide Corporation, a corporation of New York
No Drawing. Filed July 2, 1964, Ser. No. 380,073
9 Claims. (Cl. 47—9)

The present invention relates to methods of improving the physical structure of soils. More specifically the invention relates to making soil friable, i.e. inhibiting or eliminating crust formation by preventing the aggregation of soil particles.

The ultimate utility and the beneficial properties of top soils and soils of sub-surface strata depend substantially upon the physical structure of that soil. Although most soils have a fine state of subdivision necessary for the growth of plants, many do not have other physical properties which enable the proper growth and development of the plant structures and the proper performance of the various plant functions. Specifically, crust formation of certain soils after rain or sprinkling can prevent tender seedlings from emerging and result in their death. Soils of poor structures may become water-logged during wet seasons, which state excludes the air necessary for optimum growth and development of the plant. Soils of poor structure may lose moisture too rapidly by evaporation from the surface due to excessive capillary action, and plants growing therein will be deprived of the required continuous and abundant supply of moisture. The latter effect becomes excessive in closely compacted soils where also the growth of roots and stems are retarded due to unfavorable growing conditons. Soils of poor structure are subject to shrinkage which induces undesirable compaction, especially in the form of a surface crust, and produces cracks or fissures which increase the rate of transfer of soil moisture to the atmosphere. Furthermore, soils of poor structure frequently experience poor germination of seeds planted therein due to the lack of either air or moisture required for normal germination.

It is also well-known that soils of poor structure are subject to erosion because when subjected to rainfall they soon become puddled and the excess moisture flows across the surface of the soil or in a confined channel. This surface water washes away the fine soil particles and results in the displacement of large quantities of valuable soils. Much of the damage to soils of poor structure is directly attributable to raindrop impact which breaks down the existing aggregates into smaller and more readily removable fragments. The quantity of surface water is increased both by the failure of the soil to absorb surface water and by the failure of the soil to provide a medium for transferring the water to underlying bodies of soil or to natural water courses.

The problem of increasing the tilth of soils and the problem of preventing erosion may both be solved or greatly diminished by providing a means of improving the physical structure of the soil. When soil is plowed and raked it is possible to provide a loose structure which retains moisture better and contains sufficient air for the propagation of plants. The improvement of soil structure by the tillage is not long lasting and the action of rain and sun will soon cause the soil to slake down to form a dense compact structure with a hard impervious crust, thereby losing its desirable properties. If soil is cultivated over a number of years and especially if organic fertilizers are added thereto, the soil may gradually attain good structure of more permanent nature. This improvement in the structure is believed to be due to various humus materials, including polysaccharides, generated by the soil bacteria which decompose the organic additives. The improved soil structure enables larger quantities of air to be present and permits the maintenance of a more uniform supply of moisture in the soil, thereby providing a more suitable medium for the further culturing of soil bacteria. By this process the soil structure is improved by a cumulative process. Since clay and heavy loam soils may require many years to develop a satisfactory structure, it is desirable to provide a means of accelerating the formation of fertile soils. The development of good structure by intensive mechanical cultivation is not only short-lived but is frequently deleerious to the growing plants, due to the severance of the shallow feeder roots. If permanently improved structure could be maintained without the mechanical breaking of the surface layers, the rate of growth and the crop yields would be further improved.

The primary purpose of this invention is to provide a means of quickly preserving good soil structure by synthetic additives and, more specifically, to render soil more friable and to prevent crust formation after rainfall or sprinkling. If the soil to be treated is already crusted, mechanical tillage followed by application of this invention is advantageously carried out.

In accordance with my invention, good soil structure is maintained and crust formation inhibited by applying to the soil an effective amount of a non-ionic water-soluble cellulose compound or an adduct fromed by reacting such compound with an aldehyde.

The term "cellulose compound" is meant to include the well-known cellulose ethers in which the hydrogen of one or more of the hydroxyl groups of cellulose has been replaced by alkyl or hydroxyalkyl, as for instance in methyl cellulose, ethyl cellulose, hydroxyethyl cellulose, methyl hydroxyethyl cellulose, and the like; also intended to be encompassed by the term are the cellulose esters in which the said hydrogen is replaced by a carboxyalkyl group as in carboxymethyl (or ethyl, or propyl) cellulose; further, the cellulose compounds can contain both etheric and ester moieties, as in carboxyethyl methyl cellulose or carboxymethyl hydroxyethyl cellulose. Usually, the ether or ester moiety in the cellulose molecule will contain not more than 4 carbon atoms and the total number of carbon atoms in the etheric and ester substituents of a given cellulose molecule will not exceed 8.

As mentioned earlier, in many instances it is more convenient to employ, in place of the cellulose compounds described above, an adduct of such cellulose compound with an aldehyde.

As examples of especially suitable aldehydes there can be mentioned formaldehyde and glyoxal; other aldehydes which may be employed are particularly the lower aliphatic dialdehydes, such as malonaldehyde (propanedial), succinaldehyde (butanedial), glutaraldehyde (pentanedial), adipaldehyde (hexanedial), heptanedial and octanedial. Formaldehyde and glyoxal, however, are the aldehydes preferably used since they give excellent results and are readily available. Most preferred is glyoxal which, in addition to its availability, forms adducts ideally suited for the use of this invention. Formaldehyde in certain respects differs considerably from the other monoaldehydes and since in the present case formaldehyde reacts in a manner similar to that of glyoxal and other die aldehydes it is conveniently grouped together with the dialdehydes in my invention.

In the preparation of the adducts used herein, the solid cellulose ether compounds are treated with an amount of an aldehyde insufficient to substantially impair the solubility of the cellulose compound but sufficient to substantially reduce the agglomeration of the cellulose compound in water. The reaction of aldehyde and cellulose ether may be carried out in the presence of an inert liquid medium, in which the cellulose compound is insoluble, and at room temperature or at elevated temperatures.

The following examples in which parts and percentages are by weight unless otherwise stated serve to illustrate the preparation of suitable adducts.

Example I 20 grams of an ethyl hydroxyethyl cellulose having a degree of etherification of 0.7 with respect to ethoxyl groups and 0.9 with respect to ethylene oxide and having an average molecular weight corresponding to a viscosity in 2% aqueous solution at 20° C. of 1000 centipoises (measured with a Brookfield viscosimeter) was brought together with 30 milliliters of acetone in a flask. In a series of experiments, there were dissolved in the acetone various quantities of a 30% aqueous glyoxal to a content of 0.006, 0.015, 0.03, 0.15 and 0.3% (calculated as pure $(CHO)_2$) based on the solution corresponding to 0.009, 0.023, 0.045, 0.225 and 0.45% based on the cellulose ether. After half an hour the acetone-wetted ethyl hydroxyethyl cellulose was transferred to open bowls and was dried in an oven at 60° C. Tests to ascertain whether an appreciable effect has been obtained, were performed in the following manner. A beaker was filled half-full with water of 20° C. and on the water surface a few grams of the ethyl hydroxyethyl cellulose were distributed. The cellulose ether was in this experiment present in the form of granules having an average diameter of 0.5 to 1 millimeter. It was found that no granules of the untreated ethyl hydroxyethyl cellulose left the water surface to sink to the bottom due to the gelling effect when the granules initially contact the water. If the beaker was left to stand without agitation, more than one day passed before all granules were thoroughly wetted by water. The granules treated with acetone containing 0.3 to 0.15% of glyoxal left the water surface after a few seconds and dropped to the bottom of the beaker. In the other experiments of the series the effect diminished in intensity with decreasing concentration of glyoxal, but an appreciable effect was observable with as little as 0.006% glyoxal.

Example II

A methyl hydroxyethyl cellulose containing 21% of methoxyl and 4% of ethylene oxide was treated in the same manner as described in Example 1 with an acetone solution containing 0.15% of glyoxal obtained by dissolving a 30% glyoxal in acetone. In a beaker test in the manner described above a good effect was observed. The cellulose derivative particles which in this case had an average diameter of about 0.5 millimeter dropped to the bottom after a few seconds.

Example III

Carboxymethyl cellulose having a degree of substitution of 0.55 and a viscosity in 2% aqueous solution, 20° C., of 1500 centipoises (measured with a Brookfield viscosimeter) was subjected to the same treatment as described in Example II. When testing the effect in the same manner it was found that the major portion of the powder which had an average diameter of 0.1 to 0.5 millimeter passed through the water surface within only a few seconds. In an identical test with untreated carboxymethyl cellulose, only a few particles left the water surface.

Example IV

Swelled starch of a commercially manufactured type (particle size about 100 microns) and useful for instance for pasting wallpaper was treated with glyoxal under the conditions described in Example II. When the powder was distributed on the water surface in a beaker which was half-filled with water at 80° C. it was ascertained that glyoxal-treated samples were wetted considerably more rapidly than the untreated samples and that the risk of agglomeration in the dissolution was entirely eliminated by the treatment.

Example V

Polyvinyl alcohol in finely comminuted form (particle size about 40 microns) of a commercially produced type was treated in the manner described in Example I with an acetone solution containing 1.5% of glyoxal (prepared by dissolving a 30% glyoxal in the acetone). When distributing the powder on a water surface it was found that the powder dropped practically immediately to the bottom while in attempts to dissolve untreated polyvinyl alcohol in the same manner a very troublesome agglomeration was encountered.

Illustrative of commercial products falling within the class of suitable cellulose ether/glyoxal adducts are the materials sold by Union Carbide Corporation, Chemicals Division, under the trade name "Cellosize QP," e.g. Cellosize QP–15,000. Of the cellulose ether compounds that can be employed per se, the hydroxyalkyl celluloses are preferred in my invention and are exemplified by the "Cellosize WP" series sold by Union Carbide Corporation.

I have found that compounds or adducts having a viscosity of from about 500 to about 150,000 centipoises are operative in my invention but that ideally the adduct should have a viscosity of from 5,000 to 50,000 centipoises to provide a combination of efficacy in the use of this invention and easy handling qualities.

The principal reason that the adduct is sometimes more conveniently employed than a cellulose compound is that more powerful spray equipment is required to apply the more difficultly soluble compounds; I have not discovered any basic difference in the essential effectiveness of the two classes of materials once they are properly applied, as outlined below.

In applying such materials in accordance with my invention, the said compound or adduct is dissolved in water or admixed with a finely divided granular solid carrier such as clay, attapulgite, chalk, fuller's earth, gypsum, and the like.

Water solution provides by far the easiest and most efficient method of application and is exceptionally advantageous in that more spraying of the surface of the soil being treated with the solution results in remarkable inhibition of crust formation and there is no necessity for working the material into the soil which is required with most conventional products. The concentration of the compound or adduct in aqueous solution may vary from about 0.25 to about 50 percent by weight, depending primarily on the viscosity of the specific adduct used and the capability of the spray equipment to deliver viscous solutions. Preferably, concentrations of from 0.5 to 10 percent are used to effect optimum results using the preferred materials and standard spray equipment. When extremely viscous solutions are employed, it may be desirable to work the applied solution into the soil lightly with conventional apparatus.

It is also possible to apply granular compositions using the above inert solid carriers in accordance with my invention. In such solid granular compositions, the concentration of adduct can be from about 0.5 to about 20 percent by weight of adduct, preferably from 10 to 15 percent by weight. It will generally be desirable, when using the solid composition, to work the material into the soil one-half inch to two inches below the surface by means of a rototiller or the like, after the composition is first applied by conventional granular application equipment.

The doses of adduct to be applied per acre of soil treated will vary substantially according to soil type but will be in the range of from one-half pound to about 100 pounds of adduct per acre. Usually, doses of from about one to about 40 pounds, and preferably from 15 to 20 pounds for typical soils, will provide good results.

The following field tests illustrate this invention as applied to different soil types.

Example A

Two five-acre plots of very heavy Spreckels clay loam located in central California were planted with celery seeds and then one plot was treated in accordance with the invention by applying to it a one-half of one percent by weight water solution of the cellulose/glyoxal adduct sold by Union Carbide Corporation, Chemicals Division, under the trade name "Cellosize QP–15,000" to give a dose of about 16 pounds of adduct per acre. The water solution was applied by spraying it uniformly over the plot by means of a power sprayer which delivered about 10 gallons per minute at 400 p.s.i.g. The weather was not favorable to germination of the seedlings and five sprinklings were required to induce emergence of seedlings. Approximately 95 percent of the planted seedlings emerged in the treated plot while substantially no seedlings emerged in the untreated plot.

Example B

Two five-acre plots of gravelly Rincon clay loam located in central California were seeded with tomato and then one plot was treated in accordance with the invention by applying to it a one-half of one percent by weight water solution of the cellulose/glyoxal adduct sold by Union Carbide Corporation, Chemicals Division, under the trade name "Cellosize QP–15,000." The solution was applied using the sprayer of Example I, to give a dose of about 12 pounds of adduct per acre. Some rainfall occurred before the tomato seeds germinated but the stand in the treated plot was excellent. The untreated plot had to be broken up mechanically after each rain by means of ring rolling to obtain any emergence and the resulting stand was small as a consequence of damage done to the crop upon each mechanical cultivation.

Example C

Two plots of a tough Gabilan clay containing gravel, one plot covering 28 acres and a control plot covering 2 acres, located in central California were seeded with lettuce and the test plot was treated in accordance with the invention by applying to it a one-half of one percent by weight water solution of the cellulose/glyoxal adduct sold by Union Carbide Corporation, Chemicals Division, under the trade name "Cellosize QP–15,000." The solution was applied, using the sprayer of Example I, to give a dose of about 12 pounds of adduct per acre. To induce emergence of the seedlings the plots were sprinkled twice. This sprinkling resulted in compacting of the surface soil in the untreated plot to give an adobe-like surface soil structure resembling concrete. A good stand of lettuce resulted in the treated plot while no lettuce seedlings emerged from the untreated control plot.

The above examples were carried out in a similar manner using a material sold by the Hercules Powder Company under the trade mark "CMC 70S High" which is identified as sodium salt of carboxymethyl cellulose wherein from 0.65 to 0.85, on the average, of the three hydroxyl groups per glucose unit in the cellulose molecule are substituted by carboxymethyl moieties; the water solution used which contained 1 weight percent of the material had a viscosity of 1300 to 2200 centipoises at 25° C. In addition, the above experiments were carried out in the similar fashion using methyl cellulose sold by the Dow Chemical Company under the trade name "Methocel."

In cases where dissolution of the adduct in water, which is conventionally performed by vigorous mixing in a tank, results in a somewhat alkaline solution, too rapid an increase in the viscosity of the solution as the adduct dissolves can be avoided by neutralizing or buffering the solution by means of a suitable non-reactive, non-corrosive acid, such as citric acid or phosphoric acid. The amount of acid needed to result in a reactive solution is very small, in the order of one thousandth of one percent by weight of the solution.

What is claimed is:

1. The method of inhibiting crusting of surface soils which consists of applying to the soil a synthetic additive chosen from the group consisting of cellulose compounds and aldehyde adducts thereof in doses of from one-half to one hundred pounds of the additive per acre of soil treated.

2. The method of claim 1 wherein said additive has a viscosity of from 5,000 to 50,000 centipoises as measured in a Hoeppler viscosimeter at 20° C.

3. The method of claim 2 where the additive is applied in a water solution containing from one-half to forty pounds of the additive per 100 gallons of water.

4. The method as claimed in claim 1 where the additive is a cellulose compound.

5. The method as claimed in claim 1 where the additive is an aldehyde adduct of a cellulose compound.

6. The method as claimed in claim 4 where the cellulose compound is hydroxyethyl cellulose.

7. The method as claimed in claim 4 where the cellulose compound is methyl cellulose.

8. The method as claimed in claim 5 where the additive is the glyoxal adduct of a cellulose compound.

9. The method as claimed in claim 5 where the additive is the formaldehyde adduct of a cellulose compound.

References Cited by the Examiner
UNITED STATES PATENTS 2,802,303  8/1957  Weeks _____ 47—9

ABRAHAM G. STONE, *Primary Examiner.*

ROBERT E. BAGWILL, *Assistant Examiner.*